May 24, 1938.    H. C. HOOD    2,118,201
SELF GOVERNING WINDMILL
Filed Jan. 14, 1936
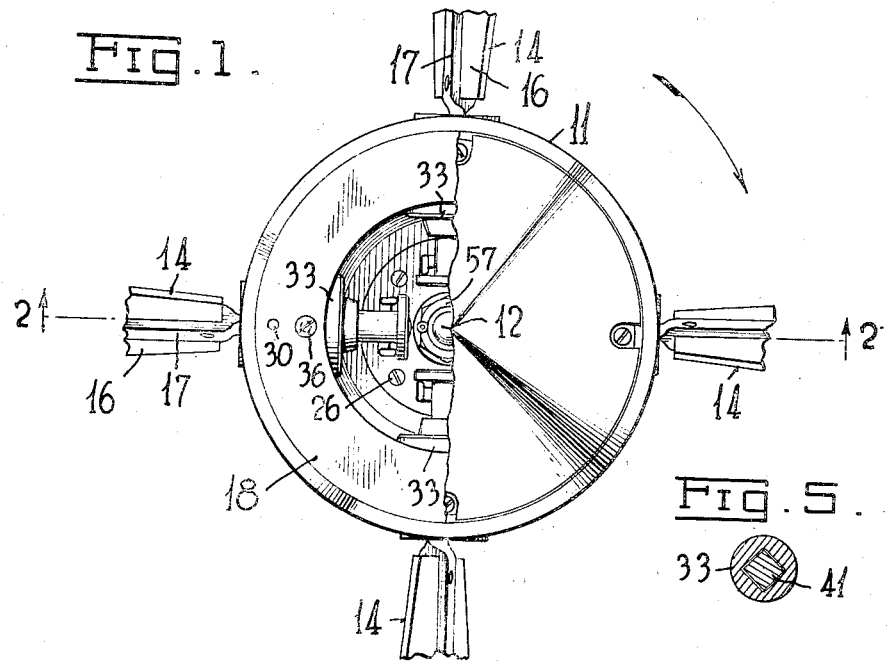
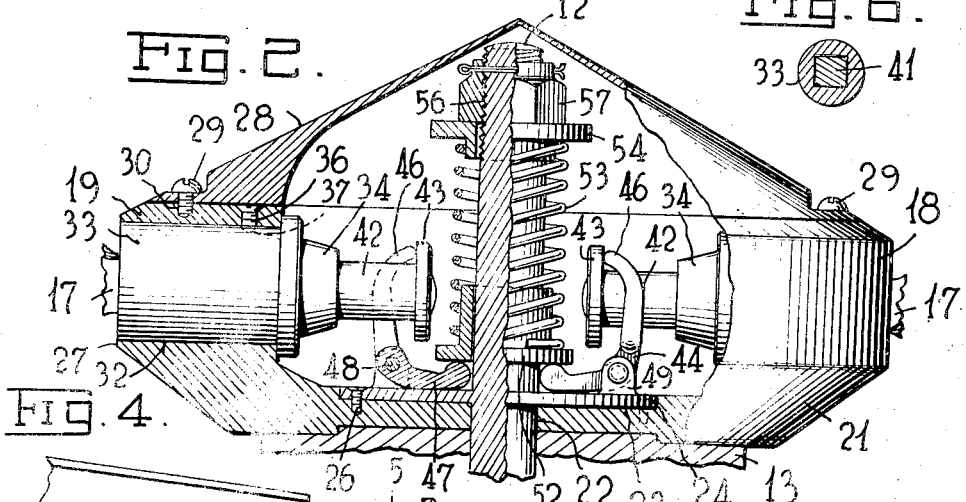
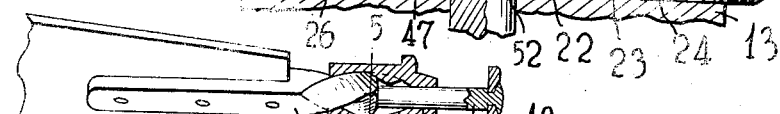

Patented May 24, 1938

2,118,201

UNITED STATES PATENT OFFICE 2,118,201

SELF-GOVERNING WINDMILL

Harry C. Hood, Great Falls, Mont.

Application January 14, 1936, Serial No. 59,127

2 Claims. (Cl. 170—68)

This invention relates to improvements in windwheels and more particularly to improvements in windwheels of the self-governing type.

Windwheels have long been employed for the utilization of natural air currents for various purposes. More recently, advances have made familiar the use of windwheels for the actuation of pumps and the generation of electrical energy. In the latter fields, among others, it is particularly desirable that the driven shaft of the windwheel be rotated at substantially constant speeds to afford rather uniform outputs regardless of the varying velocity of the wind. Centrifugal force developed to a considerable degree has been utilized to control the rate of rotation of the wheel, the blades thereof being helically slidable in a spider hub and supporting encircling springs which normally hold the blades against centrifugal displacement. Upon acceleration of the wheel beyond the desired rate, the tension of the several springs is overcome and the blades move radially outwardly and helically turned to present a smaller area to the air stream, whereby the rotation of the wheel will be held down to the desired rate despite the increased wind velocity.

In some devices of the prior art, the springs for controlling the feathering or pitch of the blades have been located radially from the wheel axis whereby they are themselves susceptible to being affected by centrifugal force; or, disposed at the axis, they have been designed with unnecessary complexity as to be relatively expensive to manufacture and/or faulty in operation due usually to uneven wear upon the various elements thereof.

An object of the present invention is to provide a windwheel which will be simple in organization, durable in construction and efficient in operation.

Another object of the invention is to provide a self-governing windwheel which will be automatic in operation and relatively inexpensive to manufacture.

A further object of the invention is to provide a simple and readily-accessible adjustment device for controlling the automatic action of the governor.

A further object of the invention is to provide a self-governing windwheel the operation of which will not be adversely affected by centrifugal force.

The invention contemplates the provision in a windwheel of blades having shafts mounted for longitudinal and rotative travel spirally in radial bearings secured in a casing concentric with the wheel shaft. To be feathered the blade moves outwardly under centrifugal force and at the same time is turned, due to the peculiar configuration of the bearing surface and the configuration of the blade shaft within the bearing. Each blade is held for maximum load by a helical spring on the wheel shaft and between concentric pressure plates for engaging an arm of a bellcrank lever fulcrumed on the casing. The other arm of the lever engages an annular flange on the inner end of the blade shaft so that the spring resists outward movement of the blade while feathering. The tension of the spring is directly controlled by an adjustable lock nut on the wheel shaft.

The invention will be better understood by reference to the following detailed specification, read in connection with the accompanying drawing forming a part thereof, in which Fig. 1 is an elevation of a windwheel, the blade extremities thereof being shown broken away for convenience;

Fig. 2 is an enlarged view, largely in vertical section as to Fig. 1;

Fig. 3 is a sectional view of a typical blade shaft of Fig. 1, showing in detail the spiral bearing therefor, and the blade in one position of adjustment therein;

Fig. 4 is a view corresponding to Fig. 3 and showing the blade shaft in another position of adjustment in the bearing;

Fig. 5 is a section taken on the line 5—5 of Fig. 3; and

Fig. 6 is a section taken on the line 6—6 of Fig. 4.

Referring to the drawing, wherein similar parts in the several views are designated by identical reference numerals, a windwheel 11 suitably mounted for driving any machine such as a pump, mill or generator, not shown, is supported by and rotatable with a main or driven shaft 12. The mainshaft 12 may be of steel and journaled for direct or indirect drive in any conventional housing 13.

The shaft 12 is driven by four vanes or blades 14, 14 extending radially and spaced equally about the shaft as the center of their revolutions. The blades 14 and the elements incident to their mounting and operation, to be described hereinafter, are preferably identical as to design and also as to relative location with respect to the driven shaft 12, in view of which the construction and operation of the blades 14 will be readily understood from a description of one such blade.

Each blade 14 comprises a flat sail portion 16 for engagement by the air stream to drive the windwheel, and a supporting shaft or shank 17 to which the sail portion 16 is rigidly affixed. The blade is connected with the driven shaft 12 by a cylindrical casing 18 which may be of aluminum, stainless steel or other weather-proof material.

The casing 18 includes a body portion 19 having a circular end 21 axially apertured at 22 to fit the driven shaft 12. The inner surface of the body end 21 is formed with a circular recess 23 into which is let flush a peripheral flange 24 integral with the shaft 12. The flange 24 is fixed to the casing end 21 by means of spaced screws 26, 26 countersunk into the flange whereby the casing and the driven shaft are rigidly interconnected. The body portion 19 also includes an annular wall 27 extending toward the free end of the shaft 12 and concentric therewith, to which is adapted to be rigidly fixed a preferably conical lid or cover 28. In order to render the cover 28 readily removable as when adjusting the parts therein, it is attached to the body portion 19 by screws 29, 29 countersunk therein to engage threaded holes 30, 30 in the body portion.

The wall 27 is provided with four equally spaced radial apertures 32 in each of which is fitted a tubular bronze sleeve or bearing 33 having a reduced inner end 34 projecting from the body wall 27. The bearings 33 are fixed by screws 36 countersunk in the wall and engaged in a recess 37 in each bearing. The bearings are formed with a helically slotted internal bore 38, the walls of which appear to be twisted, Figs. 3 and 4, which communicates at the inner end with a reduced coaxial bore 39 with cylindrical walls. The blade shank 17 is helically splined at 41 with a smooth sliding fit longitudinally in the bore 38, and has a reduced circular portion 42 in the bore 39 which projects from the reduced sleeve end 34 and is spaced from the main shaft 12. An annular guard or collar 43 is fixed to the end of the shank portion 42. As shown in Figs. 3, 4, 5, and 6, the blade shank or shaft 17 and the opening therefor in each bearing are rectangular in cross section, specifically square.

According to the above-described arrangement, it will be apparent that any radial movement of the blades will cause longitudinal movement of the shank 17 in the bearing 33, with the consequence that the blade will be revolved on its own axis proportionately. The extent of this revolution is a function of the design of the twisted or helical portions of the shank and the bearing. Although this may be varied upon occasion, in the present embodiment by reference to Figs. 3 to 6 the maximum revolution will be observed to be ninety (90°) degrees, the blade having its maximum pitch to the air stream when the angular portion 41 of the shank is adjacent to the circular portion 39 of the bearing at the inner limit of its travel, specifically as shown in Figs. 2, 3, and 5. Upon outward movement in the bearing, the blade turns on its own axis to present a smaller area to the stream thus reducing the propulsive reaction. Figs. 4 and 6, for instance, illustrate the position of the shank with respect to the bearing as the blade is turned forty-five (45°) degrees from the normal maximum.

For controlling the automatic variation of the pitch of the blade, at each blade a bell-crank lever 44, having arms 46 and 47, is fulcrumed on a pin 48 supported in trunnions 49 integral with the flange 24. The bell-crank lever is positioned between the shaft 12 and the bearing 33 to permit the arm 46, which is bifurcated, to straddle the circular portion 42 of the blade shank and rest upon the outer face of the annular collar or guard collar 43 thereof. The arm 46 is maintained in engagement with the collar 43 at all times by a flanged ring 52 which engages the arm 47 of the bell-crank lever and is slidably mounted on the main shaft 12. A helical spring 53 encircling the main shaft is compressed between the ring 52 and a similar flanged ring 54 which is also slidable on the main shaft. The end of the main shaft is threaded as at 56 to accommodate an adjusting lock nut 57, which may be advanced or retracted thereon to alter the tension of the spring.

By adjustment of the lock nut 57, the tension of the coil spring 53 may be established to warrant maintenance of the operation of the windwheel at and under any predetermined maximum speed. As long as the wind velocity is less than critical, the tendency of the blades to move outwardly due to centrifugal force is overcome by the engagement of the bifurcated arm 46 against the shank collar 43, corresponding to the pressure of the spring-pressed ring 52 on the lever arm 47. In other words, the blades can only move outwardly when the velocity of the wind is such as to rotate them sufficiently fast that enough centrifugal force is developed to offset the restraining pressure of the spring-pressed lever arm 46 against the shank collar 43. When such condition obtains, the blades may slide outwardly, but in doing so the blade shanks rotate axially in passing through the helical bearings, thus causing the blades to present a less amount of area to the wind with the result that the speed of the windwheel reduces to or below the predetermined maximum rate. As soon as the speed of the windwheel is so reduced, the centrifugal force lessens to permit the tension of the spring 53 to become effective to rotate the bell-crank levers to press the shanks back to normal position in the bearings. While the velocity of the wind may not permit return of the blades to normal position, it is obvious that by means of the construction described, a condition of equilibrium is maintained in which the windwheel rotates at not more than a certain speed as desired.

From the foregoing, it will be observed that the only parts of the apparatus liable to be affected by centrifugal force are the feathering blades, the operation of which are automatically and constantly controlled. Being mounted on the main shaft, the control spring 53 cannot be influenced by centrifugal force, and the location of the bell-crank levers adjacent the main shaft practically insures their freedom from the same force.

Provision of the lock nut 57, and its adjustability along the main shaft for the purpose of regulating the tension of the spring 53, facilitate modifying the operation to accord with local weather conditions.

It should be understood that the invention is not to be limited to the particular embodiment of the invention which has been described, but is only to be limited by the scope of the appended claims.

What is claimed is:

1. In a windwheel, the combination with a rotatable casing of a shaft, a radial bearing within said casing and mounted to revolve with the said shaft, a propeller blade shaft journalled for slidable movement in said bearing, the contour of the bearing surface therefor being polygonal in cross section taken at right angles to the axial line of the bearing and provided with a helical twist lengthwise, a lever within said casing and in engagement with said blade shaft to reflect radial movement thereof, and a spring within said casing and mounted to resist movement of the lever in one direction and by means of said lever to resist radial outward movement of said blade shaft.

2. In a windwheel, the combination with a rotatable casing of a shaft, a radial bearing within said casing and mounted to revolve with the said shaft, a propeller blade shaft journalled for slidable movement in said bearing, the contour of the bearing surface therefor being polygonal in cross section taken at right angles to the axial line of the bearing and provided with a helical twist lengthwise, an annular shoulder on said blade shaft and within said casing, a pivoted lever within said casing and having one end in engagement with said shoulder to reflect radial movement thereof, and a spring within said casing and mounted to engage and to resist movement of the opposite end of said lever in one direction and thereby to resist radial outward movement of said blade shaft.

HARRY C. HOOD.